United States Patent [19]
Fujie et al.

[11] Patent Number: 5,323,265
[45] Date of Patent: Jun. 21, 1994

[54] OUTSIDE MIRROR FOR VEHICLE INCLUDING A VIBRATOR FIXED TO A ONE-PIECE SUPPORTING MEMBER SEPARATE FROM A HOLDER MEMBER

[75] Inventors: Naofumi Fujie, Nagoya; Taneichi Kawai, Anjo; Koji Ito, Kariya, all of Japan

[73] Assignee: Aisin Seiki Kabushiki Kaisha, Kariya, Japan

[21] Appl. No.: 574,438

[22] Filed: Aug. 29, 1990

[30] Foreign Application Priority Data

Aug. 31, 1989 [JP] Japan .................................. 1-227115
Aug. 31, 1989 [JP] Japan .................................. 1-227116

[51] Int. Cl.⁵ .......................... B08B 7/02; B60R 1/06; G02B 7/182; G02B 5/08
[52] U.S. Cl. ................... 359/507; 15/250.003
[58] Field of Search ............... 359/507, 512, 846, 848; 15/250.001, 250.003, 250.005

[56] References Cited

U.S. PATENT DOCUMENTS

| 3,856,384 | 12/1974 | Kryzhanovsky | 359/848 |
| 5,155,625 | 10/1992 | Komatsu et al. | 359/507 |

FOREIGN PATENT DOCUMENTS

| 57-117540 | 1/1984 | Japan | 359/507 |
| 62-150201 | 7/1987 | Japan | 359/507 |
| 1-113069 | 7/1989 | Japan | 359/507 |

Primary Examiner—Jon W. Henry
Attorney, Agent, or Firm—Burns, Doane, Swecker & Mathis

[57] ABSTRACT

An outside mirror for a vehicle includes a generally planar member, a supporting member rigidly secured to the generally planar member and a vibrator rigidly secured to the supporting member. A space is provided between the generally planar member and the supporting member. The supporting member and the generally planar member have a similar coefficient of linear expansion in order to reduce the stress applied to the generally planar member and lessen the distortion of the planar member.

14 Claims, 8 Drawing Sheets

Fig. 7

OUTSIDE MIRROR FOR VEHICLE INCLUDING A VIBRATOR FIXED TO A ONE-PIECE SUPPORTING MEMBER SEPARATE FROM A HOLDER MEMBER

BACKGROUND OF THE INVENTION

This invention relates to an outside mirror for a vehicle which sustains a clear rear view in spite of foreign substances such as rain drops, ice and frost.

Referring to FIG. 8, a conventional outside mirror will be explained. By way of example, Japanese Utility Model Laid Open Application No. 01-113069 published on Jul. 28, 1989, discloses such a conventional outside mirror. The outside mirror includes a mirror member 104, a supporting member 105 fixed to the mirror member 104 by a connecting member 151, and a piezoelectric vibrator 102 fixed to the supporting member 105. The connecting member 151 provides a space between the supporting member 105 and the mirror member 104. The mirror member 104 can be resonated by oscillating the vibrator 102 and the supporting member 105. Rain drops, ice, frost, and other foreign substances can be removed from the mirror member 104 due to the resonance vibration on the mirror member 104.

However, in the conventional outside mirror, if the supporting member 105 is made from an undesirable material, the supporting member 105 may stress the mirror member 104 due to variations in temperature. If the stress from the supporting member 105 is transferred to the mirror number 104, the reflecting image may be distorted.

Further, if the supporting member 105 is made from an undesirable material, the supporting member 105 may absorb oscillations of the vibrator 102. If the supporting member 105 absorbs the oscillations of the vibrator 102, rain drops, ice, frost or other foreign substances cannot be quickly removed from the mirror member 104.

SUMMARY OF THE INVENTION

Accordingly, one of the objects of the present invention is to obviate the aforementioned drawbacks associated with conventional outside mirrors.

An additional object of the present invention is to provide an optimum material for the supporting member.

Another object of the present invention is to provide an outside mirror which enables a clear rear view without distortion in spite of variations in temperature.

A further object of the present invention is to provide an outside mirror that is able to remove rain drops, ice, frost and other foreign substances from the mirror quickly.

To achieve the above objects and in accordance with the principles of the present invention as embodied and described herein, an outside mirror for a vehicle includes a supporting member having a coefficient of linear expansion that is similar to the coefficient of linear expansion of the mirror member.

In addition, the supporting member preferably possesses a small damping factor.

BRIEF DESCRIPTION OF THE DRAWING FIGURES

An understanding of the present invention will become apparent from the accompanying drawing figures, which are incorporated in and constitute a part of the specification, and which illustrate embodiments of the present invention, wherein like elements bear like reference numerals and wherein;

FIG. 7 is a graph illustrating the amplitude on the mirror member versus the damping factor of the supporting member for various power inputs to the vibrator.

DETAILED DESCRIPTION OF THE PREFERRED EMBODIMENTS

Reference will now be made in detail to the preferred embodiments of the present invention. Referring to FIGS. 1 to 5, the first embodiment of the present invention will be explained.

Figure 3:
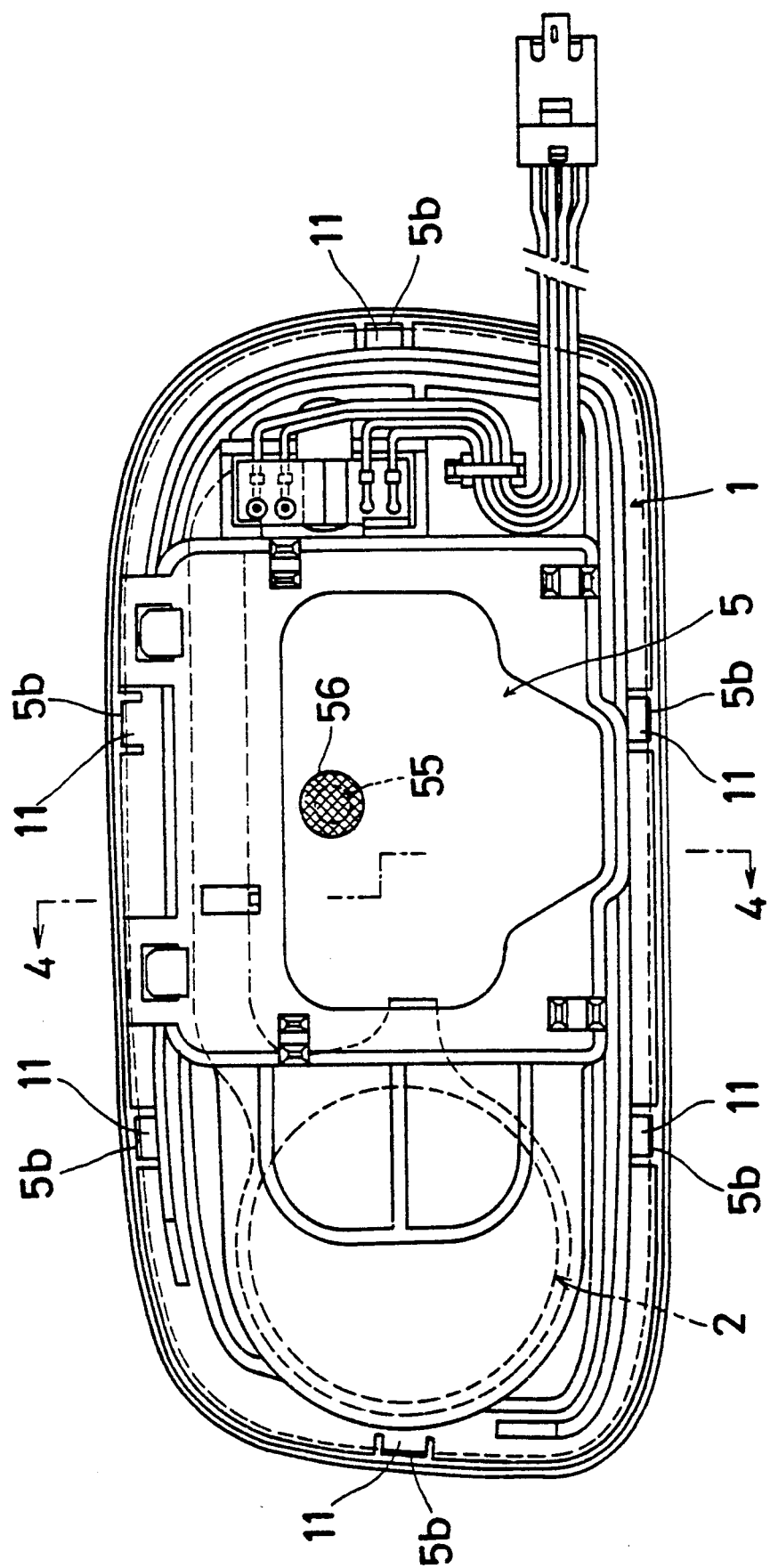
FIG. 3 is a rear view of the holder member for accommodating the mirror member, the supporting member and the heating member according to the first embodiment of the present invention.
Figure 4:
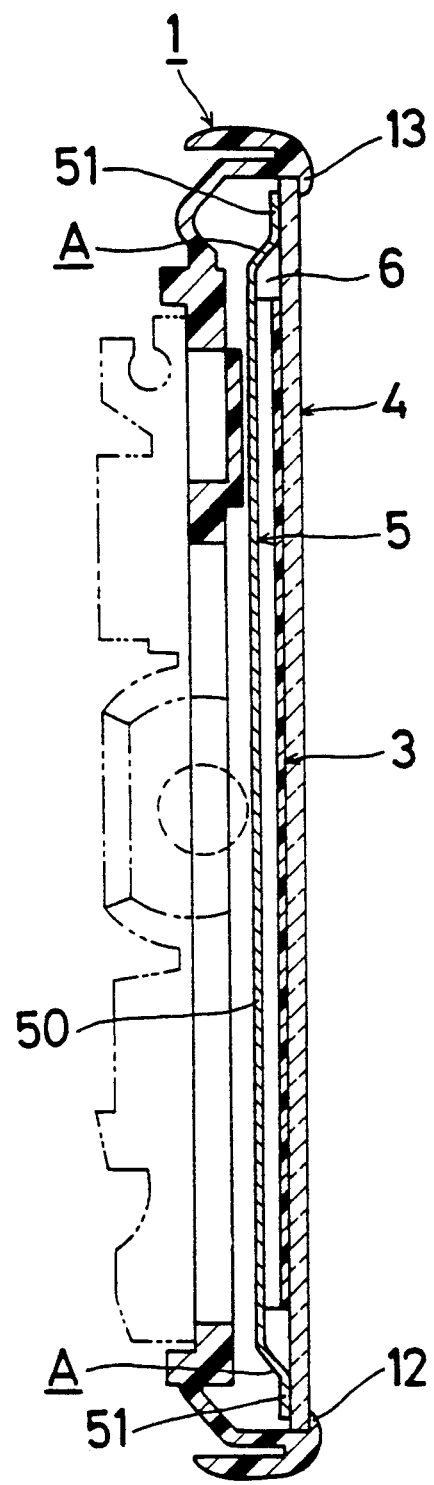
FIG. 4 is a cross-sectional view of the holder member for accommodating the mirror member, the supporting member and the heating member according to the first embodiment of the present invention along the section line 4—4 in FIG. 3.

With reference initially to FIGS. 3 and 4, a holder member 1 is made from synthetic resin and is formed by an injection process. The holder member 1 has an opening 12 which is located on an incident side, and a sustaining portion 13 which surrounds the opening 12. In the holder member 1, a mirror member 4 which has a proper curvature is installed. The holder member 1 is supported by a vehicle body via a mirror housing (not shown).

The mirror member 4 includes a transparent glass and a reflecting layer (not shown). The transparent glass is exposed through the opening 12.

Figure 1:
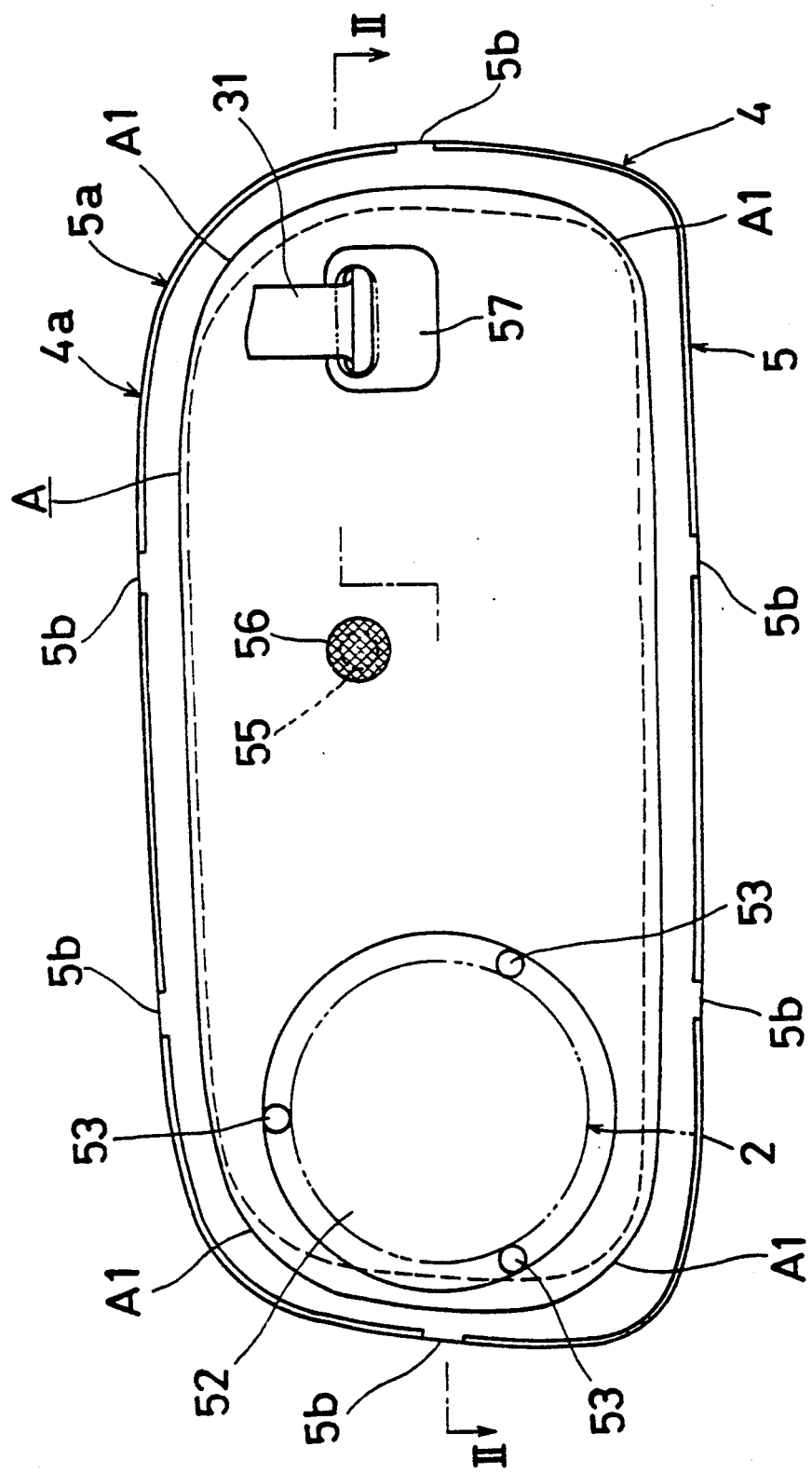
FIG. 1 is a rear view of a side mirror having a mirror member, a supporting member and a heater member according to a first embodiment of the present invention.
Figure 2:
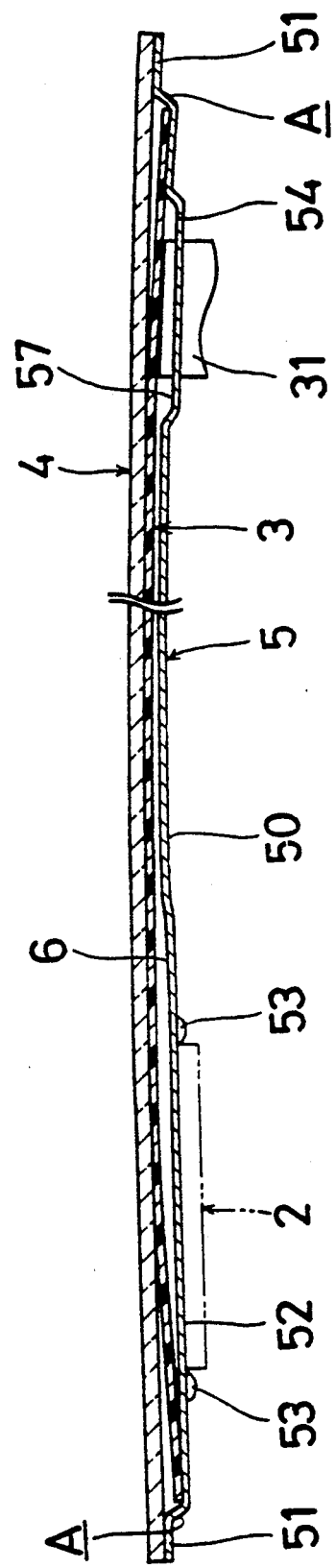
FIG. 2 is a cross-sectional view of the mirror member, the supporting member and the heater member according to the first embodiment of the present invention along the section line 2—2 in FIG. 1.

As seen in FIGS. 1 and 2, a supporting member 5 is disposed substantially parallel to the mirror member 4. A space 6 is provided between the mirror member 4 and the supporting member 5. The space 6 is provided by an encircling stepped portion A of the supporting member 5. The stepped portion A encloses the space 6. As can be seen in FIG. 1, the curvature of the stepped portion (A) is larger than that of the mirror member 4 on each corner A1. The reflection of the oscillation produced by the vibrator can be reduced on each corner A1 of the supporting member 5 by increasing the curvature of the stepped portion A.

The supporting member 5 is slightly smaller in size than the mirror member 4 so that the adhesive used to secure the mirror member 4 to the supporting member 5 is not inadvertently placed on the exposed surface of the mirror member 4. The difference in size between the outer circumference 4a of the mirror member 4 and the outer circumference 5a of the supporting member 5 can be about 1 to 2 millimeters. The difference in size between the mirror member 4 and the supporting member 5 is preferably as small as possible in order to transfer as much of the oscillation of the supporting member 5 to the mirror member 4 as possible.

The supporting member 5 is made from a metal plate having almost the same coefficient of linear expansion as the mirror member 4. The supporting member 5 can be formed from ferritic stainless steel, martensitic stainless steel, titanic materials or other similar material. The coefficient of linear expansion of these materials is approximately $9 \times 10^{-6}$. Compared to those metals, the coefficient of linear expansion of the transparent glass is approximately $8 \times 10^{-6}$. Thus, the coefficient of linear expansion of the aforementioned metals is quite similar to and almost substantially the same as the coefficient of linear expansion of the mirror member 4.

The supporting member 5 includes a plate portion 50 having a curvature that is almost the same as the curvature of the mirror member 4. The supporting member 5 also includes a connecting portion 51 which extends around the plate portion 50. The connecting portion 51 is adhered to the mirror member 4 in a rigid and tight manner. After adhering the supporting member 5 to the mirror member 4, the narrow and long space 6 is provided between the supporting member 5 and the mirror member 4. The plate portion 50 includes a flat portion 52 where the vibrator 2 is adhered. Projections 53 are provided on the flat portion 52 in order to properly locate and position the vibrator 2.

The connecting portion 51 has the same curvature as the mirror member 4 in order to distribute adhesive uniformly and thinly around the mirror member 4, and to prevent distortion from being generated. Similarly, the flat portion 52 has the same flat surface as the vibrator 2 so as to distribute adhesive uniformly and thinly on the vibrator 2. The uniform and thin adhesive layer can facilitate the transfer of the oscillation of the supporting member 5 to the mirror member 4.

Figure 5:
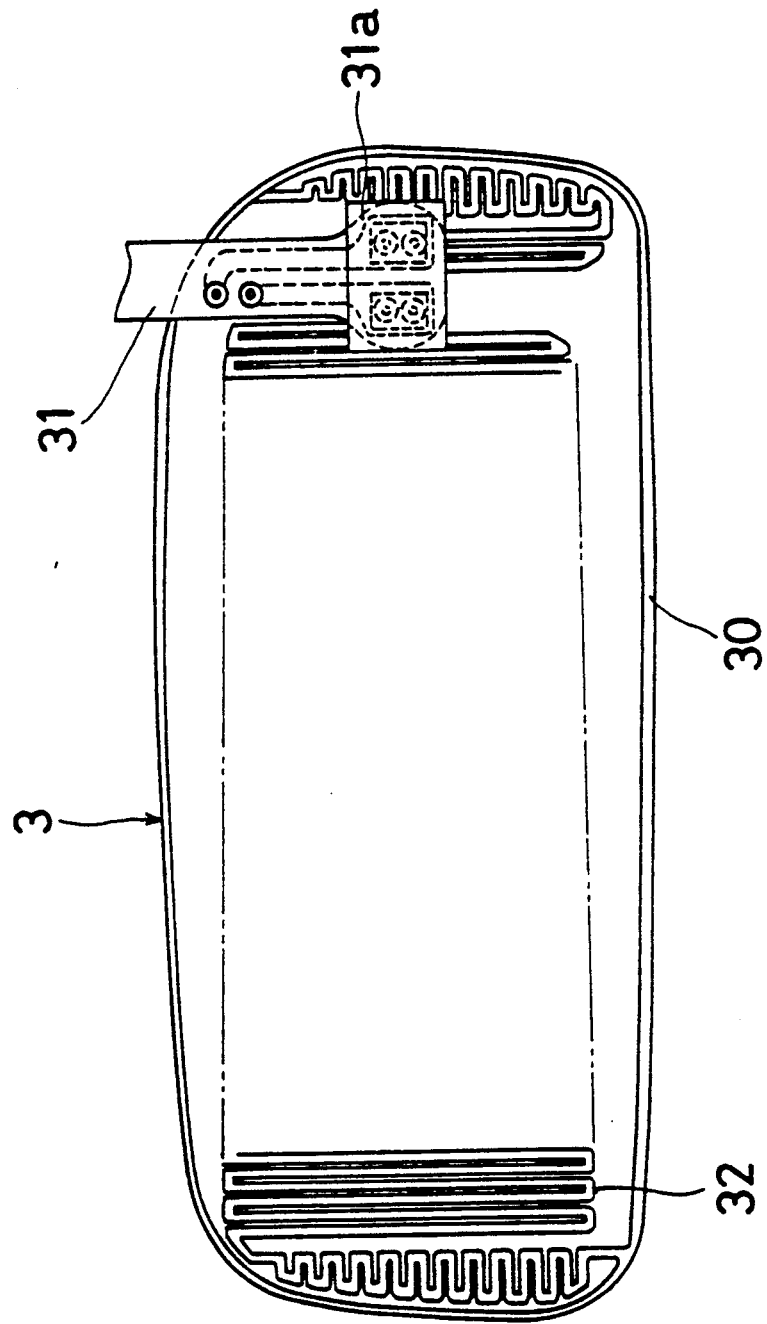
FIG. 5 is a rear view of the heating member according to the first embodiment of the present invention.

A slot 54 through which extends a flexible conductor 31 is also provided on the support member 5. The flexible conductor 31 supplies the electric power to the heater 3. After inserting the flexible conductor 31 into the slot 54, the slot 54 is sealed tightly by sealing resin. The flexible conductor 31 is electrically and mechanically connected to the heater 3 through a connection 31a as seen in FIG. 5. A depressed portion in the support member 5 accommodates the connection 31a to space the connection 31a from the support member 5.

Six projections 5b are provided on the supporting member 5. These projections 5b are pinched by the spring portion 11 of the holder member 1 in order to fix the mirror member 4 and the supporting member 5 to the holder member 1.

The space 6 between the supporting member 5 and the mirror 4 is closed since the supporting member 5 is adhered to the mirror member 4 and the slot 54 is sealed tightly. Therefore, water drops may develop in the space 6 due to variations in temperature. The water drops undesirably absorb the oscillation on the mirror member 4 and the supporting member 5 and in order to avoid this absorption, in this embodiment, a small hole 55 is provided on the supporting member 5. The hole 55 is covered with a water proof cloth having good aeration properties. The small hole 55 communicates the space 6 with the atmosphere. If water drops develop in the space 6, the water drops are atomized due to the oscillation of the mirror member 4 and the supporting member 5. The atomized water drops are then released through the hole 55.

As seen in the FIG. 5, the heater member 3 includes a flexible base 30 and a heater pattern or a zig-zag formed resistor 32 which covers the flexible base 30. The flexible base 30 can be made from an isolating material which has a low coefficient of friction. The heater pattern 32 is connected to the flexible conductor 31 which supplies electric power to the heater member 3. As illustrated in FIG. 2, the heater member 3 is adhered to the supporting member 5. The heater member 3 is bent or arched slightly so that the center of the heater member 3 contacts the mirror member 4.

When electric power is supplied to the vibrator 2, the vibrator 2 expands and contracts radially. The radial expansion and contraction of the vibrator 2 generates oscillation in the supporting member 5 and the mirror member 4. If the proper frequency is supplied to the vibrator 2, a standing wave is generated on the mirror member 4 due to resonation of the mirror member 4, the supporting member 5 and the vibrator 2. The water drops or other foreign substances are removed from the mirror member 4 due to the standing wave.

When electric power is supplied to the heating member 3, the heater pattern 32 generates heat. The heat is transferred to the mirror member 4 by conduction, convection and radiation. The ice or other foreign substances on the mirror member 4 are melted due to the heat and removed from the mirror member 4 by the standing wave.

The mirror member 4 and the supporting member 5 are expanded due to the heat which is generated by the heater member 3. However, in this embodiment, the coefficient of linear expansion of the support member 5 is similar to and almost substantially the same as the linear expansion of the mirror member 4. Therefore, although the support member 5 is rigidly adhered to the mirror member 4, less stress is applied to the mirror member 4. Thus, the distortion of the mirror member 4 can be decreased. Since the mirror member 4 is not distorted, the supporting member 5 is prevented from being separated from the mirror member 4. Further, the tight connection between the mirror member 4 and the supporting member 5 can be maintained for a long time. Furthermore, the possibility of the mirror member 4 being broken is substantially eliminated.

Since the plate portion 50 of the supporting member 5 possesses substantially the same curvature as the mirror member 4, the distance between the mirror member 4 and the supporting member 5 can be reduced. Further, a uniform heat distribution in the space 6 can be achieved since the space 6 has almost the same thickness throughout. Therefore, the mirror member 4 can be heated quickly.

Figure 6:
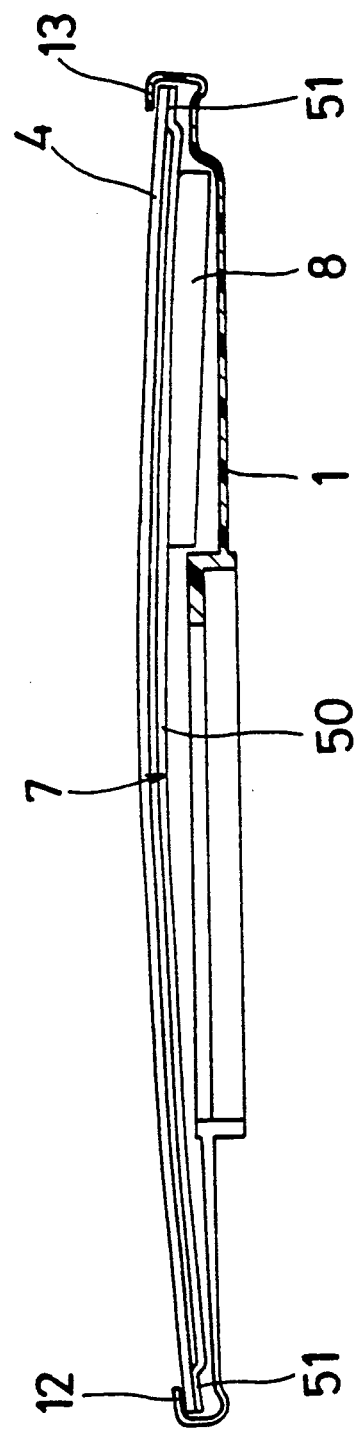
FIG. 6 is a cross sectional view of a holder member for accommodating a mirror member, a supporting member, and a heating member according to a second embodiment of the present invention.
Figure 8:
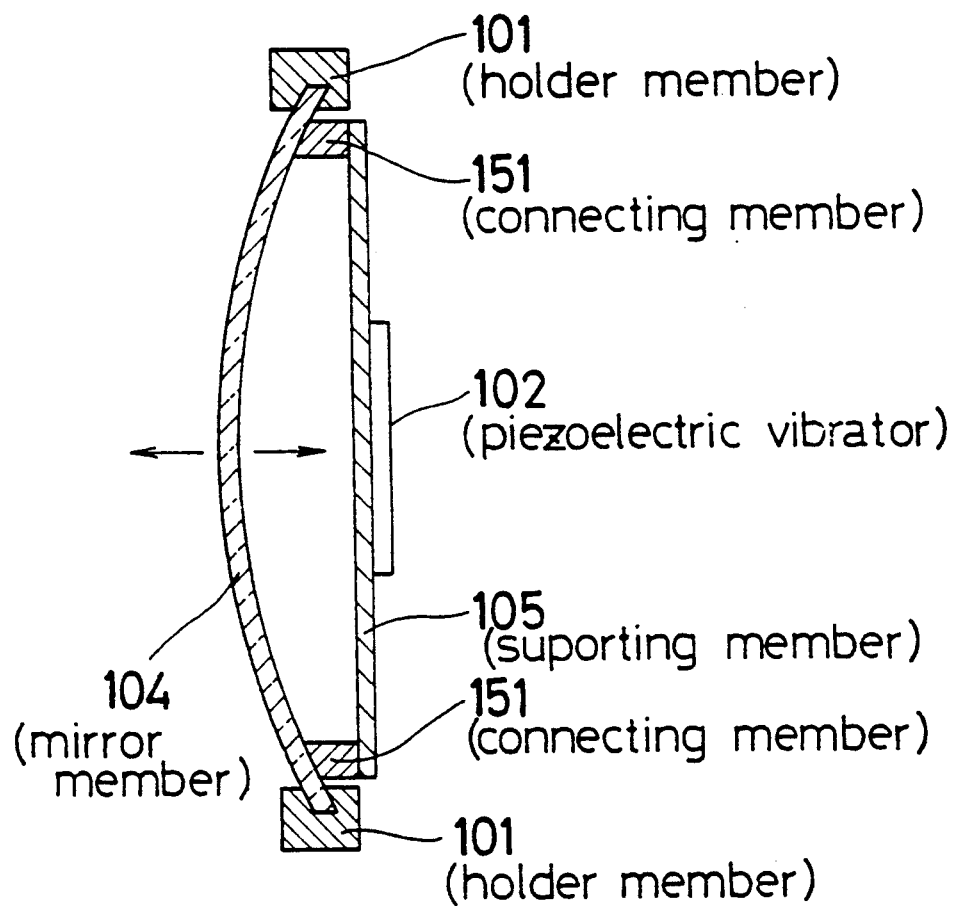
FIG. 8 is a cross-sectional view of a conventional outside mirror for a vehicle.

In accordance with a second embodiment of the present invention which is illustrated in FIG. 6, a supporting member 7 is adhered to the mirror member 4 and a piezoelectric vibrator 8 is adhered to the supporting member 7.

Figure 7:
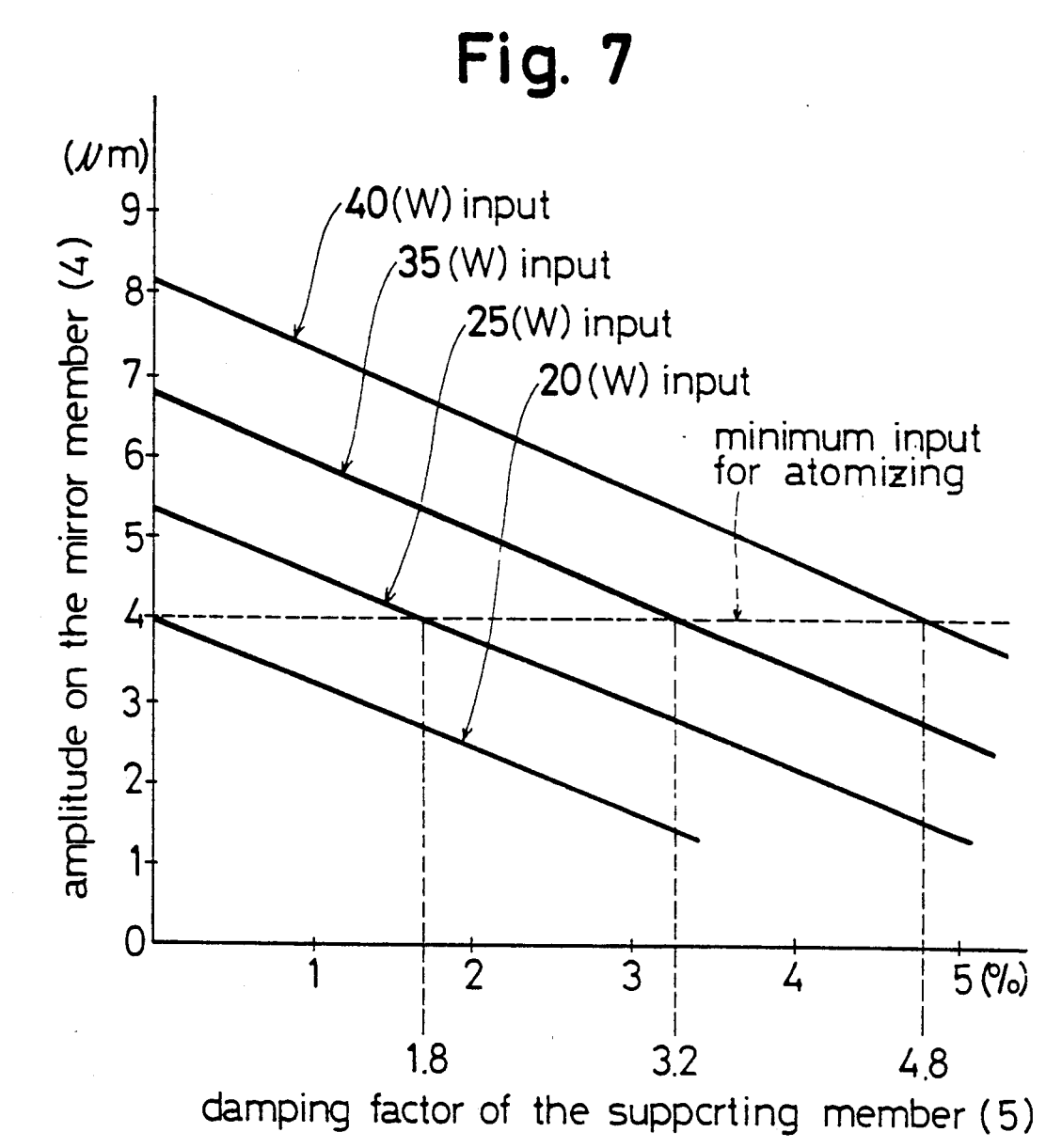

FIG. 7 graphically illustrates the damping factor of the supporting member 5 versus the amplitude of movement of the mirror member 4 for various power inputs to the vibrator.

At approximately 50 kHz, about 4 μm of amplitude is required for the standing wave which is generated on the mirror member 4 in order to atomize the water drops on the mirror member 4.

Further, the typical mirror member 4 for the vehicle mirror has almost 162 cm$^2$ of area. That area can, however, be varied depending on the design of the mirror. Considering the area of the mirror member 4, the diameter of the vibrator 8 may be smaller than 6 cm. On the other hand, the maximum input power of the vibrator 8 is about 1.5 W/cm$^2$ as long as the vibrator 8 is cooled naturally by the atmosphere. Therefore, the maximum input which is supplied to the vibrator 8 is limited to less than approximately 40 W.

Thus, the damping factor of the supporting member 5 can be selected. If the maximum input, which is approximately 40 W, is supplied to the vibrator 8, the damping factor of the supporting member 5 should be under about 4.8%. However, the maximum input may deteriorate the life of the vibrator 8. Therefore, approximately 25 W input is more preferable than the maximum input. If the 25 W input is supplied to the vibrator 8, the damping factor of the supporting member 5 should be less than about 1.8%.

The supporting member 5 can be made from titanic material, titanic alloy, phosphor bronze, brass, aluminum alloy, 0.65% carbonized steel, 0.8% carbonized steel, 18-8 stainless steel or similar materials. Since the supporting member 5 having a damping factor less than about 1.8% can transmit the oscillation of the vibrator 8 very well, the power input necessary for effectively removing water drops from the mirror member 4 can be quite small.

Since the ferritic stainless steel, the martensitic stainless steel and the titanic materials are less susceptible to rust and easier to form into the shape of the supporting member 5, those materials are preferable for the supporting member 5. The titanic materials are probably one of the best materials for the supporting member 5 because the coefficient of linear expansion and the damping factor of those materials are preferred.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations, changes and equivalents may be made by others without departing from the spirit of the present invention. Accordingly, it is expressly intended that all such variations, changes, and equivalents which fall within the spirit and scope of the present invention as defined in the claims, be embraced thereby.

What is claimed is:

1. An outside mirror for a vehicle comprising:
    a holder member to be supported on a vehicle;
    a mirror member mounted on the holder member;
    a one-piece supporting member separate from the holder member, said one-piece supporting member being directly in contact with and rigidly fixed to the mirror member;
    a space provided between the mirror member and the one-piece supporting member;
    a vibrator rigidly fixed to the one-piece supporting member for generating oscillation in the one-piece supporting member, the oscillation generated in the one-piece supporting member through operation of the vibrator being transmitted directly to the mirror member, said one-piece supporting member and said mirror member having similar coefficients of linear expansion.

2. The outside mirror according to claim 1, wherein the supporting member is fabricated from a ferritic stainless steel material.

3. The outside mirror according to claim 1, wherein the supporting member is fabricated from a martensitic stainless steel material.

4. The outside mirror according to claim 1, wherein the supporting member is fabricated from a titanic material.

5. The ordinary mirror according to claim 1, wherein the supporting member has damping factor less than 5.0%.

6. The outside mirror according to claim 1, wherein the supporting member has damping factor less than 4.8%.

7. The outside mirror according to claim 1, wherein the supporting member has damping factor less than 3.3%.

8. The outside mirror according to claim 1, wherein the supporting member has damping factor less than 1.8%.

9. The outside mirror according to claim 1, including air communication means for communicating said space with atmosphere located outside of the space.

10. The outside mirror according to claim 9, wherein the communication means includes a hole provided in the supporting member.

11. The outside mirror according to claim 9, wherein the communication means includes a waterproof member covering a hole in the supporting member for preventing water from entering the space.

12. The outside mirror according to claim 1, wherein an outer peripheral region of the supporting member is stepped to define said space, said supporting member being smaller in size than the mirror member.

13. The outside mirror according to claim 1, wherein said one-piece supporting member possesses a substantially constant thickness throughout its entire extent.

14. The outside mirror according to claim 1, wherein an outer peripheral edge of said one-piece supporting member is directly in contact with and rigidly fixed to the mirror member, said outer peripheral edge of the one-piece supporting member having a thickness that is substantially the same as the thickness of portions of the one-piece supporting member located radially inwardly of the outer peripheral edge.

* * * * *